June 17, 1969 F. A. NELSON 3,450,952

SUPERCONDUCTING MAGNET APPARATUS

Filed Aug. 30, 1965 Sheet 1 of 2

INVENTOR.
FORREST ARTHUR NELSON
BY
Wm. J. Nolan
ATTORNEY

INVENTOR.
FORREST ARTHUR NELSON
BY
Wm. J. Nolan
ATTORNEY

3,450,952
SUPERCONDUCTING MAGNET APPARATUS

Forrest Arthur Nelson, Palo Alto, Calif., assignor to Varian Associates, Palo Alto, Calif., a corporation of California Filed Aug. 30, 1965, Ser. No. 483,402
Int. Cl. H01h 47/00; G01n 27/00; H01f 7/22
U.S. Cl. 317—123 15 Claims

ABSTRACT OF THE DISCLOSURE

A superconducting magnet apparatus is disclosed including a main superconducting coil and a pair of superconducting correction coils respectively disposed proximate the ends of the main coil. All three of the coils are connected in a single series circuit and variable resistance means are shunted across the coils so that the ratios of the currents flowing through the coils can be variably controlled thus enabling the configuration of the magnetic field to be adjusted as desired.

This invention relates to superconducting magnet apparatus, and in particular to a novel and improved means for controlling currents that are supplied to multi-coil superconducting solenoids.

Superconducting magnets have been found to be useful with apparatus wherein high magnetic fields are desired, such as in gyromagnetic resonance systems. One form of superconducting magnet employs a main solenoid winding in combination with a pair of end correction coils, such as described in copending application Ser. No. 334,495, filed Dec. 30, 1963, assigned to the same assignee.

It is generally known that magnetic fields which are produced by solenoids do not provide the exact shape that one anticipates as a result of calculations. Such variance arises as a result of imperfections of the solenoid windings and materials, and the observed difference is even greater when working with high field superconducting magnets. Such field distortions tend to degrade the operation and resolution of the system in which the superconducting magnet is utilized. Thus, various solutions have been proposed for establishing and maintaining the uniformity of a magnetic field.

It is known that superconducting magnet coils have zero resistance, and therefore the control of current in a superconducting circuit in order to control field characteristics involves a different approach than with normal type circuitry. In a superconducting magnet system, it is not possible to bypass current around a superconducting coil, by shunting with an appropriate resistance. This difficulty arises because such resistance cannot draw current from a zero voltage, which is produced by a steady current through the zero resistance of the superconducting coil.

An object of this invention is to provide a novel and improved superconducting magnet apparatus.

Another object is to provide a superconducting magnet apparatus, wherein the magnitude of the currents in the main and correction windings of the solenoid may be controlled, whereby the configuration of the magnetic field, in turn, may be controlled.

According to this invention, a superconducting magnet apparatus comprises a main coil and at least one correction coil conected in series. The coils are coupled to a power supply through a control circuit, including a resistive network, having variable resistance means coupled to the correction coil means. In this manner, the ratios of current directed through the coils may be controllably varied, so that the configuration of the magnetic field is adjustable.

The invention will be described in greater detail with reference to the drawing in which.

Figure 1:
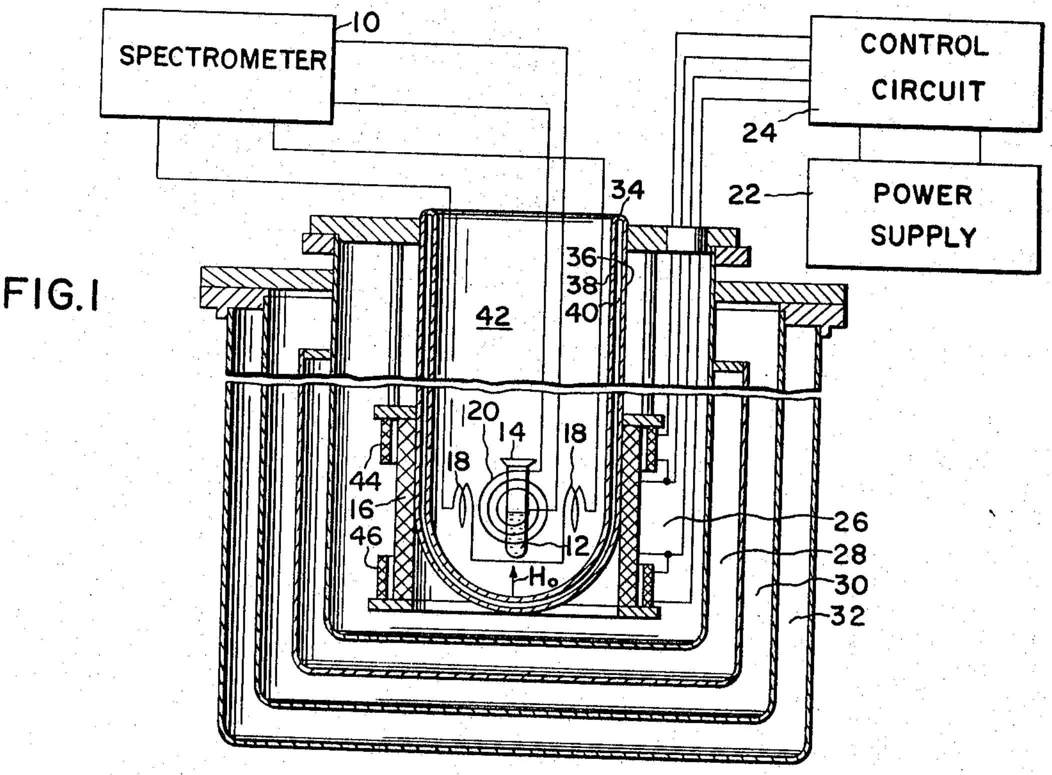
FIG. 1 is a schematic diagram of a cross-section of the inventive apparatus, partly shown in block form.

With reference to FIG. 1, a superconducting magnet system, that may be utilized with a spectrometer 10 includes a sample of matter 12 which is to be investigated disposed within a tub 14. The sample 12 is positioned within the central portion of a magnetic field $H_0$ produced by a superconducting main solenoid 16. A pair of transmitter coils 18 are disposed straddling the sample 12, with their axes at approximately right angles to the direction of the magnetic field $H_0$. The transmitter coils 18 are energized by radio frequency (R.F.) wave energy derived from a transmitter (not shown) of the spectrometer apparatus 10. A detector or receiver coil 20 is disposed adjacent to the sample of matter 12 with its axis oriented at approximately right angles to the axis of the transmitter coils 18 and to the direction of the magnetic field $H_0$. The receiver coil 20 is connected to the input of an R.F. receiver (not shown) forming part of the spectrometer apparatus 10.

The superconducting solenoid 16 is energized from a power supply 22 through a control circuit 24, in accordance with the present invention. The control circuit 24 may be mounted on the magnet in the superconducting atmosphere but is preferably disposed adjacent to the external power supply 22. The solenoid 16 generates a high intensity uniform D.C. magnetic field $H_0$, for example 20–8 kilogauss over a region of 0.5″ x 0.5″ x 2.0″. The circuits associated with the power supply 22 and superconducting solenoid 16 will be more fully described hereinafter.

In operation, the solenoid 16 is energized and R.F. energy derived from the transmitter of the spectrometer 10 is applied to the sample 12, substantially at the Larmor frequency of the gyromagnetic particles within the sample under analysis, thereby exciting gyromagnetic resonance of such particles. The resonance of these particles is detected by excitation of an R.F. signal in the receiver coil 20 at the Larmor frequency. The resonance signal is applied to the input of the spectrometer receiver, and is amplified and detected to provide an output D.C. resonance signal which is recorded by a recorder (not shown). A gyromagnetic resonance signal spectrum of the sample under analysis is obtained by sweping the D.C. magnetic field intensity $H_0$ through successive resonances of the groups of gyromagnetic particles within the sample 12, by means of a sweep generator (not shown) which provides sweep signal to the power supply 22, which in turn sweeps the current flow through the solenoid 16. In addition, the sweep generator supplies a signal to the recorder causing the resonance signal to be recorded as a function of the sweep field. The gyromagnetic resonance signal spectrum obtained from the recorder is useful for chemical analysis of the sample 12 under investigation.

The superconducting magnet system includes a hollow cylindrical chamber 26 surrounding the solenoid 16 and filled with a coolant, such as liquid helium, at a very low temperature, approximately 4° k. by way of example. The chamber 26 is insulated from ambient temperature by means of a plurality of coaxial surrounding chambers. A first chamber 28 is evacuated to a very low pressure, for example $10^{-6}$ millimeters, to minimize thermal conduction therethrough. The vacuum chamber 28 is surrounded by a second chamber 30 containing liquid nitrogen at approximately 77° k. The liquid nitrogen chamber 30 is in turn surrounded by a third chamber 32 having a vacuum for minimizing thermal conduction between the outside air and the nitrogen chamber 30. The outer wall of the vacuum chamber 32 forms the outer wall of the magnet assembly and is exposed on its outer surface to atmospheric conditions.

A glass or metal Dewar 34 is disposed centrally of the superconducting solenoid 16. The outer wall of the Dewar 34 forms the inner wall of the liquid helium chamber 26. The Dewar includes two coaxially disposed and spaced apart glass or metal walls 36 and 38 with a vacuum chamber 40 disposed therebetween. The inner coaxial wall 38 defines an open-ended finger-like chamber 42, subject to ambient conditions, which extends down into the center of the superconducting solenoid 16. The finger-like chamber 42 is open at the upper end to permit access to the magnetic field from the top.

In a typical installation, the superconducting solenoid 16 provides a D.C. magnetic field of up to 65 kilogauss. The solenoid 16 is constructed of a suitable superconducting material, such as copper jacketed NbZr wire, to provide a uniform field over its central region. This region of uniform field is cylindrical and is approximately ½″ in diameter and 2″ long.

The magnet apparatus of this invention includes end correction solenoid windings 44 and 46 that serve to generate a highly homogeneous magnetic field, in accordance with mathematical analysis. A detailed description of such an application may be found in an article in the Journal of Applied Physics, vol. 34, No. 11, November 1963, pages 3175–3178, by H. L. Marshall and H. E. Weaver, entitled "Application of the Garrett Method to Calculation of Coil Geometries for Generating Homogeneous Magnetic Fields in Superconducting Solenoids"; and in Science, Oct. 9, 1964, vol. 146, No. 3641, pages 223–232, F. A. Nelson and H. E. Weaver, entitled "Nuclear Magnetic Resonance Spectroscopy in Superconducting Magnetic Fields." (See FIGURE 2 especially.)

Figure 2:
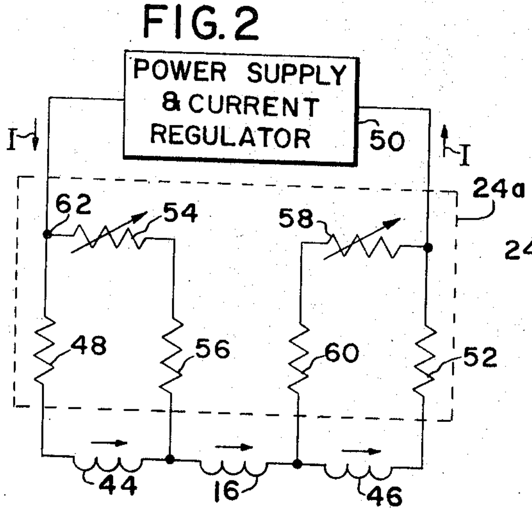
FIG. 2 is a circuit diagram illustrating one embodiment of a control circuit, that is utilized in combination with the superconducting magnet apparatus in accordance with this invention.
Figure 3:
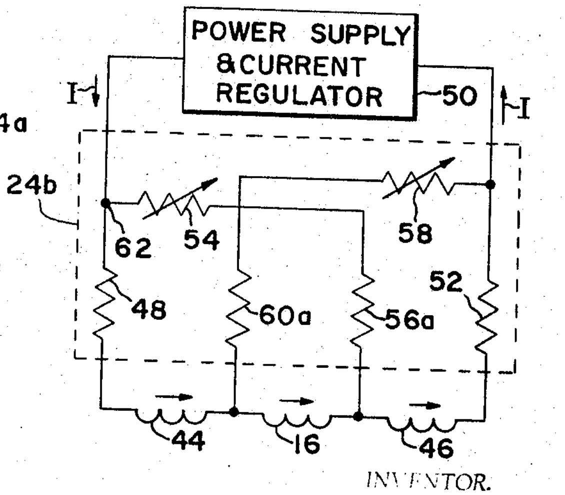
FIG. 3 is a circuit diagram of an alternative embodiment of a control circuit that may be utilized with the inventive apparatus.

The end correction coils 44 and 46 are connected in series with the main coil 16, and the ends of the correction coils are coupled to the control circuit 24, as illustrated in the embodiments of FIGURES 2 and 3. It is preferable to run the coils closely connected in series, otherwise loss in the connecting leads results from boiling away the expensive liquid helium, which is utilized to achieve cryogenic temperatures.

In FIGURE 2, a control circuit **24*a* includes a first fixed resistance 48 coupled between a power supply-current regulator 50 and one end of a correction coil 44; and similarly, a second fixed resistance 52 coupled between the power supply-regulator 50 and one end of the correction coil 46. A shunt circuit, comprising a variable resistance 54 and fixed resistance 56, is coupled across the first correction coil 44 and resistor 48; and a second shunt circuit, comprising a variable resistance 58 and fixed resistance 60, is coupled across the second correction coil 46 and fixed resistance 52**.

In operation, the magnetic field generated by the superconducting magnet is subject to inhomogeneities and nonuniformity resulting from spurious variations in power input, or other undesirable changes, as is well known in the art. Such erratic changes affect the spectral signal being observed, and recognizable distortions appear on the recorder or oscilloscope which registers the spectral signal. In accordance with this invention, the ratios of the currents in the windings 16, 44 and 46 may be adjusted to compensate for the nonuniform magnetic field encompassing the sample 12.

The main winding 16 receives the same current that is presented to the junction 62 located between the resistor 48 and the variable resistance 54. In effect, the current from the power supply 50 will divide between the resistor 48 and the shunt circuit of variable resistance 54 and fixed resistance 56, in inverse proportion to the impedances seen at the junction 62. Thus, the amount of current that appears at the correction coil 44, depends on the setting of the variable resistance 54. Likewise, the current that passes through the correction coil 46 depends on the setting of the resistance 58.

The magnitudes of the current in each coil may be defined as follows:

(1) $$I_{16}=I$$

(2) $$I_{44}=I\frac{R_{54}+R_{56}}{R_{54}+R_{48}+R_{56}}$$

(3) $$I_{46}=I\frac{R_{58}+R_{60}}{R_{58}+R_{60}+R_{52}}$$

In operation a trained technician may observe an output signal, such as the spectral signal of a gyromagnetic resonance system, and determine the adjustments that are necessary for making the magnetic field more uniform and homogeneous. By simple adjustments of the variable resistances 54 or 58, different gradients may be altered by a redistribution of magnetic flux to achieve a relatively uniform field configuration. The arrangement of FIGURE 2 is utilized when the correction coils 44 and 46 require less current than the main coil 16.

However, if more current is required at the end correction windings as compared with the main coil, then the alternative embodiment illustrated in FIGURE 3 is used. In such case, the shunt circuit constituting the resistances 54 and **56*a* is coupled in parallel across the series circuit including the windings 16 and 44; and similarly, the shunt circuit incorporating the resistors 58 and 60*a* is coupled in parallel across the series circuit including the windings 16 and 46**.

The relations of the currents in the configuration of FIGURE 3 are as follows:

(1) $$I_{16}=I\left[1-\frac{I_{48}}{R_{54}+R_{48}+R_{56}}-\frac{R_{52}}{R_{58}+R_{60}+R_{52}}\right]$$

(2) $$I_{44}=I\frac{R_{54}+R_{56}}{R_{54}+R_{48}+R_{56}}$$

(3) $$I_{46}=I\frac{R_{58}+R_{60}}{R_{58}+R_{60}+R_{52}}$$

A combination of the circuits of FIGURES 2 and 3 may be used according to the requirements of current in the coils 16, 44 and 46. Also, the current from the power supply 50 may be varied to achieve suitable current levels, while the current ratios remain as set by the variable resistances. In the event of rapid changes of current in the superconducting system, the reactive voltage from the coil inductances modifies the currents during such changes.

Figure 4:
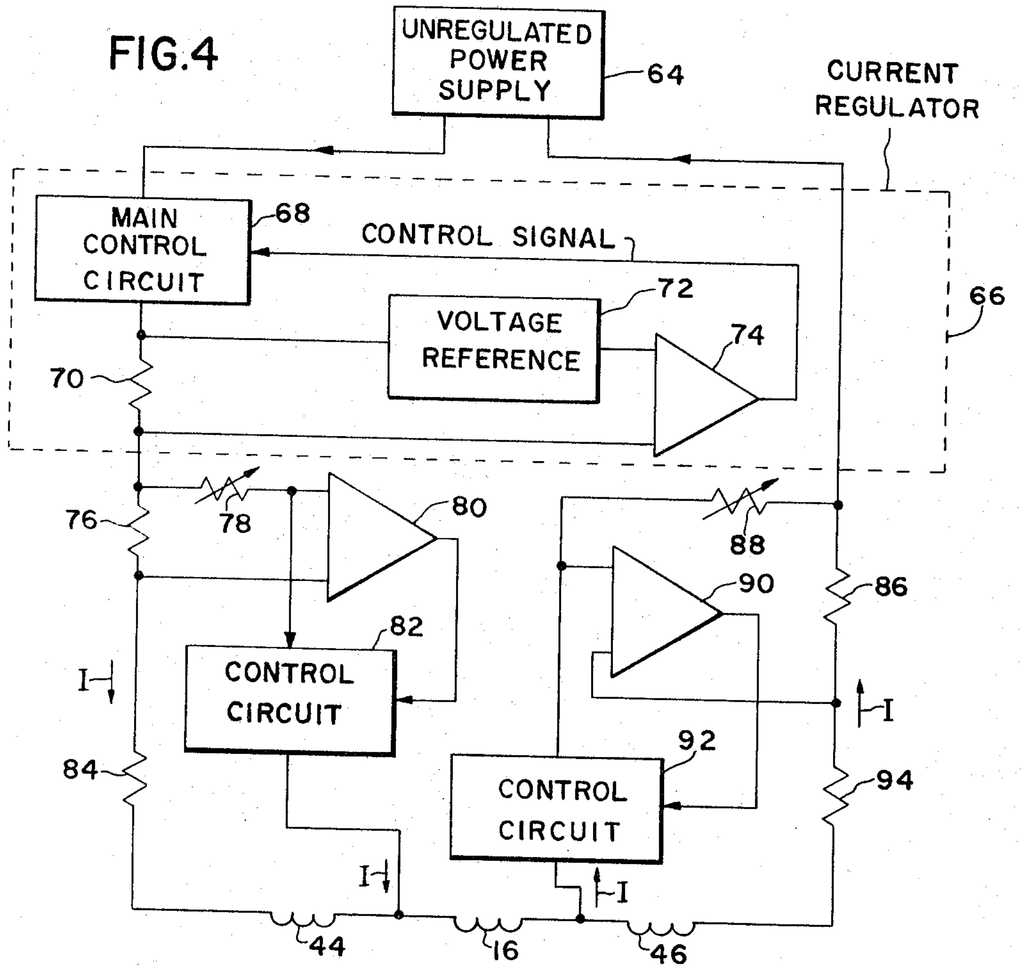
FIG. 4 is a block and schematic diagram of another embodiment of the invention.

In such superconducting magnet circuits which employ bypass legs or current ratio networks as described above with reference to FIGS. 2 and 3, it is known that the resistances of the leads adjacent to the superconducting coils slightly affect the magnitude of the currents to each coil. To overcome this condition, the circuit illustrated in FIGURE 4 provides a novel combination, wherein an unregulated power supply 64 is regulated by a current regulator 66, which includes a control circuit 68 that receives a substantially constant current from the supply 64. The output current from the control circuit 68 is sampled by a reference resistance 70, and the voltage or voltage drop across such resistor 70 is compared to a reference voltage from a reference 72 by means of a differential amplifier 74. If the voltage across the resistance 70 is different from the voltage of the reference 72, then an error signal is fed to the main control circuit 68 through a feedback loop to vary the output current accordingly. Such adjustment occurs until the current through the resistance 70 is of a desired magnitude, governed by the level of the reference 72. The main current magnitude can be varied by adjustment of reference voltage 72 or by varying resistor 70.

The current from the resistance 70 is divided at a junction between a fixed ratio resistor 76 and variable resistance 78 in a manner described with relation to FIGURES 2 and 3. The ends of resistors 76 and 78 furthest from their junction are connected to a high gain differential amplifier 80. If there is a difference between the voltage drop across resistor 76 and resistor 78, this difference voltage is amplified by an amplifier 80 and is fed as a control circuit 82 which varies the current from the resistance 78 to establish a correct ratio between the currents from the resistances 76 and 78. A compensating resistor 84 is supplied in series in the leg including resistance 76 to balance the resistive effect of the control circuit 82. In this fashion, a desired ratio of currents between the main coil 16 and the end coil 44 is produced. The current ratio is adjusted by variable resistor R78. This ratio is:

$$\frac{I_{44}}{I_{16}}=\frac{R_{78}}{R_{76}+R_{78}}$$

Similarly, coils 46 and 16 are coupled to a network including a fixed ratio resistance 86 and variable resistance 88, with a high gain differential amplifier 90, control circuit 92 and compensating resistance 94, to achieve the ratio controls for these coils.

In the embodiment depicted in FIG. 4, the leads adjacent to the coils 44, 16 and 46 afford negligible effect and because of high gain of amplifiers 80 and 90, only resistors 76, 78, 86 and 88 are significant for determining the currents that reach the coils. It is understood that the control circuits 82 and 92 may be located in the same leg with resistances 76 and 86, and compensating resistors 84 and 94 placed in lieu thereof in the legs including resistances 78 and 88; or both legs may incorporate control circuits, if so desired.

In operation of a spectrometer apparatus utilizing superconducting magnets, it is often desirable to change the field supplied by the superconducting magnet to a much different value, e.g., from 10 kilogauss to 50 kilogauss. When the field is so varied hysteresis effects can be introduced whereby the magnetic field is distorted. To compensate for this undesirable effect on the field configuration, the circuit of FIGURE 5 may be used. A main current control in a form of a variable resistance 96 is coupled to a power supply and current regulator 98 to adjust the magnitude of the main current to the coils 16, 44 and 46. The variable resistance 96 is mechanically ganged to variable resistances 100 and 102, such that the current through the respective legs including variable resistance 104 and fixed resistor 106, and variable resistance 108 and fixed resistance 110, is varied with changes in position of the potentiometer or resistance 96. Thus, the ratio of current in resistance 112 to that in resistance 106, and the ratio of current in resistance 114 to that in resistance 110 may be varied; or these ratios may be maintained substantially the same, with only a corresponding change in the magnitude of current in each leg. To effectuate the various changes, a programmer or computer may be utilized to provide desired current ratios as a function of magnetic field. Linear or nonlinear potentiometers may be employed for the variable resistance means in the circuit.

Figures 5, 6A, 6B:
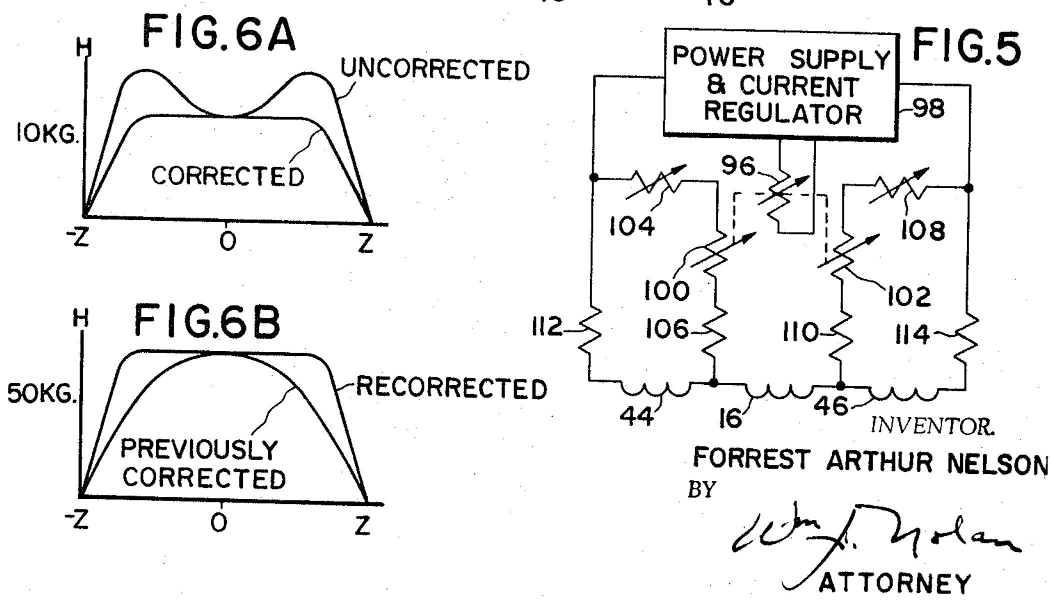
FIG. 5 depicts still another variation of the inventive circuit.
FIGS. 6A and 6B are representations of magnetic field configurations to illustrate the features of this invention.

FIGURES 6A and 6B represent magnetic field plotted against the axis defined by the coils. In FIGURE 6A, assuming a field of about 10 kilogauss, the field is shown as corrected to provide a substantially uniform configuration around the central point of the axis Z through the main coil 16. If the field is increased to 50 kilogauss, as in FIGURE 6B, then the previously corrected field requires a recorrection, which may be accomplished with a circuit such as shown in FIGURE 5.

In one embodiment of the invention as illustrated in FIG. 2, that was employed successfully, the resistors 48, 52, 56 and 60 each had a value of about .001 ohm; the variable resistances 54 and 58 each had a range between .01 and 1 ohm, the resistance 54 being set at about 0.2 ohm and the resistance 58 being set at about 0.4 ohm.

These resistor values are only illustrative, and are not to be considered as limiting. It is to be understood that other parameters and values of the inventive system may be modified and changed within the scope of this invention.

What is claimed,

1. A superconducting magnet apparatus comprising:
a main superconducting coil for generating a magnetic field;
at least one correction superconducting coil serially connected to said main coil; and
at least one current ratio resistance network connected in circuit with said coils for controlling the ratio of currents in said coils.

2. A superconducting magnet apparatus as in claim 1 including, a power supply for supplying current to said coils, and wherein said at least one current ratio resistance network comprises at least one fixed resistance means connected between said power supply and said at least one correction coil and at least one shunt circuit means connected across said at least one fixed resistance means and between said main coil and said at least one correction coil.

3. A superconducting magnet apparatus comprising:
a main superconducting coil for generating a magnetic field when energized with current;
a first correction superconducting coil coupled to one end of said main coil;
a second correction superconducting coil coupled to the other end of said main coil, all of said coils being electrically connected in series;
a power supply for supplying current to said coils; and
a control circuit for controlling the ratios of the current in said coils.

4. A superconducting magnet apparatus as in claim 3, wherein said control circuit includes:
a first fixed resistance connected between the power supply and the first correction coil;
a first shunt circuit disposed across said first fixed resistance, and connected to one end of said main coil;
a second fixed resistance connected between the power supply and the second correction coil; and
a second shunt circuit disposed across said second fixed resistance and connected to the other end of the main coil.

5. A superconducting magnet apparatus as in claim 4, wherein said first shunt circuit includes a first variable resistance and a third fixed resistance in series; and said second shunt circuit includes a second variable resistance and a fourth fixed resistance in series.

6. A superconducting magnet apparatus as in claim 4, wherein said one end of the main coil connected to said first shunt circuit is adjacent to the first correction coil, and said other end of the main coil connected to the second shunt circuit is adjacent to the second correction coil.

7. A superconducting magnet apparatus as in claim 4, wherein said one end of the main coil connected to said first shunt circuit is adjacent to the second correction coil, and said other end of the main coil connected to said second shunt circuit is adjacent to the first correction coil.

8. A superconducting magnet apparatus as in claim 5 wherein all of said fixed resistances have substantially the same resistive value.

9. A superconducting magnet apparatus as in claim 5, wherein each of the first and second variable resistances is of greater resistivity than any of the fixed resistances.

10. Apparatus comprising:
a superconducting solenoid for providing a magnetic field; field correction superconducting coils disposed adjacent to said solenoid and electrically connected in circuit therewith;
a power supply for supplying current to said coils; and
a current ratio determining means for establishing a ratio of currents in said solenoid and coils, connected between said power supply and said solenoid and coils.

11. A spectrometer apparatus comprising:
means for supporting a sample to be analyzed;
a superconducting solenoid disposed substantially concentrically about said sample;
end correction superconducting coils disposed adjacent to said solenoid;
a power supply for supplying current to said coils; and
a control circuit connected between said power supply and said solenoid and correction coils for establishing a ratio of currents in said solenoid and coils.

12. A spectrometer apparatus as in claim 11 wherein said control circuit comprises variable resistance means connected between said power supply and said main coil and said end correction coils.

13. A superconducting magnet apparatus comprising:
a main superconducting coil for generating a magnetic field when energized with current;
a first correction superconducting coil coupled to one end of said main coil;
a second correction superconducting coil coupled to the other end of said main coil, all of said coils being electrically connected in series;
an unregulated power supply for supplying current to said coils;

a current regulator coupled to said power supply; and
current ratio determining resistance means and control circuit means coupled to said current regulator for controlling the ratios of the currents to said coils.

14. A superconducting magnet apparatus as in claim 13, including a differential amplifier coupled to said ratio determining means.

15. A superconducting magnet apparatus comprising:
a main superconducting coil for generating a magnetic field when energized with current;
a first correction superconducting coil coupled to one end of said main coil;
a second correction superconducting coil coupled to the other end of said main coil, all of said coils being electrically connected in series;
a power supply for supplying current to said coils;
first variable resistance means connected to said power supply for controlling the current output from said power supply;
second variable resistance means connected between said power supply and said coils for determining the ratio of current in said coils, said first and second variable resistance means being mechanically ganged.

References Cited

UNITED STATES PATENTS 3,336,526 8/1967 Weaver et al. ---------- 324—.5

JOHN F. COUCH, *Primary Examiner.*

J. D. TRAMMEL, *Assistant Examiner.*

U.S. Cl. X.R.

324—.5; 335—216; 338—325